Oct. 11, 1960  B. H. PINCKAERS  2,956,168
ELECTRIC APPARATUS
Filed July 6, 1959  2 Sheets-Sheet 1

INVENTOR.
BALTHASAR H. PINCKAERS
ATTORNEY

2,956,168

United States Patent Office
Patented Oct. 11, 1960

2,956,168
ELECTRIC APPARATUS
Balthasar H. Pinckaers, Minneapolis, Minn., assignor to Minneapolis-Honeywell Regulator Company, Minneapolis, Minn., a corporation of Delaware Filed July 6, 1959, Ser. No. 825,219

6 Claims. (Cl. 250—83.6)

This invention is concerned with an improved electric apparatus and particularly with an improved electric apparatus utilizing a transistor network connected in a unique manner to provide a quenching function for a high voltage condition sensing means.

Specifically, the present invention contemplates the use of transistors to perform a quenching function for a condition sensor of the type having a pair of electrodes disposed in an ionizable gaseous medium, of which a Geiger tube is an example. This type of condition sensor may be of either the selfquenching or nonselfquenching type; however the present invention is particularly useful with the nonselfquenching type condition sensor. In this type sensor it is necessary, once the sensor has been subjected to an ionizing event, that the operating voltage be removed, or at least substantially reduced, to thereby cause the sensor to de-ionize. Apparatus to perform a quenching or de-ionization function must therefore of necessity be capable of modifying the operating voltage of the sensor.

In the present invention this is accomplished by means of a monostable transistor network wherein this transistor network controls a transformer, the transformer in turn functioning to modify the operating voltage of the sensor to quench the sensor.

More specifically, the present invention provides a monostable transistor network which is connected to be controlled by the condition sensor and which in turn control the saturation condition of a saturable transformer, to drive this transformer into saturation upon the sensor experiencing an ionizing event. A winding of this saturable transformer is connected in circuit with the sensor and upon the transformer being driven into saturation, a voltage is developed which causes the sensor to be quenched.

The present invention will be apparent to those skilled in the art upon reference to the following specification, claims, and drawings, of which:

Figure 1:
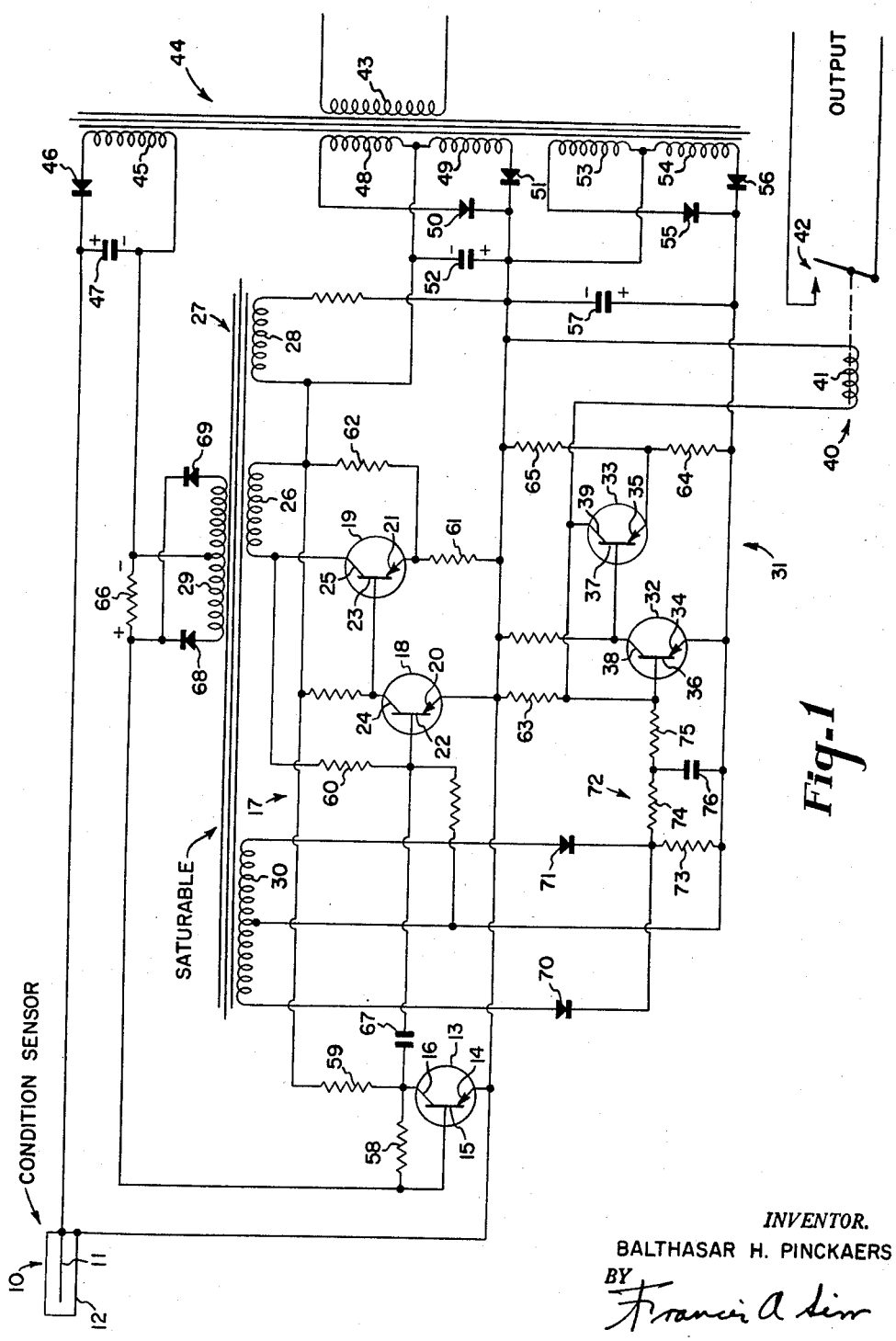
Figure 1 is a schematic representation of the present invention.

Referring specifically to Figure 1, the reference numeral 10 designates a condition sensor, for example, a Geiger tube having an anode 11 and a cathode 12. The Geiger tube 10 is connected in controlling relation to an amplification stage including a transistor 13 having an emitter electrode 14, a base electrode 15, and a collector electrode 16.

The transistor 13 is connected in controlling relation to a monostable network designated generally by reference numeral 17. This monostable network 17 includes a first transistor 18 and a second transistor 19. These transistors are provided with emitter electrodes 20 and 21, base electrodes 22 and 23, and collector electrodes 24 and 25. The output of monostable network 17 is connected to the first primary winding 26 of a saturable transformer 27. The saturable transformer 27 is also provided with a second primary winding 28 which functions to reset the core material of the saturable transformer, a first secondary winding 29, and a second secondary winding 30.

The second secondary winding 30 is connected to control a further network designated generally by the reference numeral 31. This further network includes transistors 32 and 33 having emitter electrodes 34 and 35, base electrodes 36 and 37, and collector electrodes 38 and 39. The output of the apparatus of Figure 1 consists of a relay 40 having a winding 41 and a normally open switch 42.

Operating voltage for the apparatus of Figure 1 is derived from alternating current power lines, not shown, to which the primary winding 43 of a supply transformer 44 is connected. The supply transformer 44 is provided with a first secondary winding 45 which in conjunction with a rectifier 46 and a capacitor 47 provides a high magnitude D.C. voltage which is connected to Geiger tube 10 to supply operating voltage for the Geiger tube.

Supply transformer 44 also is provided with secondary windings 48 and 49 which are connected to rectifiers 50 and 51 to charge a capacitor 52 and to provide a relatively low magnitude operating voltage for the transistors 13, 18 and 19 as well as providing a voltage to energize primary winding 28 of the saturable transformer 27. The polarity of the voltage provided on capacitor 52, as shown in Figure 1, when applied to the primary winding 28 of transformer 27, causes the core material of this transformer to be reset from a saturated condition to an unsaturated condition.

The supply transformer 44 also includes secondary windings 53 and 54 which are connected to rectifiers 55 and 56 to charge a capacitor 57. The voltage developed across capacitor 57 provides the low magnitude operating voltage for transistors 32 and 33 and likewise the energizing voltage for the winding 41 of relay 40.

*Operation of Figure 1*

Considering the operation of the apparatus of Figure 1 in greater detail, with the apparatus in the standby condition, Geiger tube 10 is de-ionized, as it is when it is not subjected to an ionizing condition. Transistor 13 is in a conducting state which is established by a biasing circuit which can be traced from the lower terminal of capacitor 52 through the emitter to base circuit of transistor 13, resistor 58, and resistor 59 to the upper terminal of capacitor 52.

Transistor 18 is also in a conducting condition which is established by a biasing circuit which can be traced from the lower terminal of capacitor 52 through the emitter to base circuit of transistor 18, resistor 60, and primary winding 26 to the upper plate of capacitor 52. This bias current is however of a relatively low magnitude so as not to appreciably affect the magnitude of the magnetic flux of transformer 27.

Transistor 19 is in a nonconducting condition which is established by means of the circuit which connects the emitter 21 of this transistor through resistor 61 to the emitter electrode of transistor 18 and the base electrode 23 directly to the collector electrode 24 of transistor 18. Since transistor 18 is in a conducting condition, the voltage drop from the emitter to the collector is very low and the voltage developed across resistor 61 in the voltage divider 61—62 maintains transistor 19 in a cutoff condition.

Transistor 32 is in a conducting condition which is established by means of a biasing circuit which can be traced from the lower terminal of capacitor 57 through the emitter to base circuit of transistor 32 and through resistor 63 to the upper terminal of capacitor 57. The resistors 64 and 65 form a voltage divider across capacitor 57 and since transistor 32 is in a conducting state, the emitter to collector voltage of this transistor is relatively low. The base electrode 37 of transistor 33 is directly connected to the collector of transistor 32 and the emitter electrode 35 of transistor 33 is connected through resistor 64 to the emitter of transistor 32. Therefore, the voltage developed across resistor 64 in the voltage divider 64—65 maintains transistor 33 in a nonconducting condition. The winding 41 of relay 40, which is connected in the emitter to collector circuit of transistor 33, is therefore de-energized.

Assume now that Geiger tube 10 is subjected to an ionizing condition. This ionizing condition may be a background count of irregular and infrequent occurrence or may be an ionizing event due to the establishment of a condition to which the Geiger tube is sensitive, for example, the presence of flame in the area monitored by the Geiger tube. Upon Geiger tube 10 becoming ionized, a current flow circuit can be traced from the upper terminal of capacitor 47 through Geiger tube 10, the emitter to base circuit of transistor 13, and resistor 66 to the lower terminal of capacitor 47. It can be seen from this circuit that this current flow causes transistor 13 to conduct to a greater extent and therefore the potential of the collector electrode 16 moves in a positive direction, approaching the potential of the positive terminal of capacitor 52. Therefore, a positive pulse of voltage is coupled through capacitor 67 to the base electrode 22 of transistor 18. The effect of this positive pulse of voltage at transistor 18 is to overcome the normal biasing current which maintains this transistor conductive and to thereby render transistor 18 nonconductive.

Upon transistor 18 being rendered nonconductive, the potential level of its collector electrode 24 moves in a negative direction and approaches the potential of the negative terminal of capacitor 52. Therefore, the base electrode 23 of transistor 19 becomes negative with respect to the emitter electrode 21 of this transistor, thereby rendering transistor 19 conductive. Upon transistor 19 being rendered conductive, a current flow circuit can be traced from the positive terminal of capacitor 52 through resistor 61, the emitter to collector circuit of transistor 19, and primary winding 26 of saturable transformer 27 to the negative terminal of capacitor 52.

At the instant that transistor 19 is first rendered conductive, transformer 27 is in an unsaturated condition, this condition being established by means of the second primary winding 28 and its connection to capacitor 52. Therefore, the voltage of capacitor 52 is distributed between the resistor 61, the emitter to collector circuit of transistor 19, and primary winding 26. The magnitude of resistor 61 is such that the major portion of this voltage is dropped across primary winding 26 and therefore the base electrode 22 of transistor 18 is maintained at substantially the same voltage as is the emitter electrode 20 of this transistor. Therefore, transistor 18 is maintained in a cutoff condition by means of a feedback circuit including resistor 60 which connects the base electrode 22 of transistor 18 to the collector electrode 25 of transistor 19.

After a relatively short time period however the current flowing through the primary winding 26 starts to increase rapidly as transformer 27 saturates. This is especially so when rectangular hysteresis loop material is used. When the transformer saturates, the impedance of primary winding 26 drops and the major portion of the voltage established at capacitor 52 is now dropped across resistor 61 and the emitter to collector circuit of transistor 19. The potential level of emitter 25 of transistor 19 therefore becomes more negative and this negative voltage is applied to the base electrode of transistor 18 through resistor 60 to thereby once again render transistor 18 conductive. Upon this transistor becoming conductive, the emitter to collector voltage drops and transistor 19 is again biased to cutoff by means of the voltage developed across resistor 61. Since transistor 19 is no longer conductive, the current flowing through the second primary winding 28 is now effective to restore transformer 27 from the saturated to a unsaturated condition.

The above description has traced the cycle of operation of the monostable network 17 from its stable to its unstable condition and back to its stable condition. In this cycle of operation, transformer 27 is driven to saturation and then returned to an unsaturated condition. Such action causes a voltage to be induced in both secondary winding 29 and secondary winding 30 of transformer 27. Considering first the transformer secondary winding 29, the voltage induced in this winding is rectified by means of rectifiers 68 and 69 and this voltage is applied across resistor 66. The polarity of this voltage is such that the lefthand terminal is positive with respect to the righthand terminal. This voltage is in opposition to the voltage established at capacitor 47. Therefore, the voltage applied to the Geiger tube is the algebraic sum of the voltage developed across resistor 66 and that developed across capacitor 47. The electrical components are so selected that this algebraic sum results in a low voltage which results in an operating voltage no longer being applied to the Geiger tube. The Geiger tube is thereby quenched or rendered nonconductive.

Considering now the secondary winding 30, this secondary winding likewise has a voltage induced therein and this voltage is rectified by means of rectifiers 70 and 71. The rectified voltage is applied to an integrating network identified generally by the reference numeral 72 and including resistors 73, 74, and 75 and capacitor 76.

The integrating means 72 functions to discriminate between a random background count at Geiger tube 10 and a sustained count at the Geiger tube which is indicative of the condition to which the Geiger tube is sensitive. In the explanation thus far we have considered only a single ionizing event passing through the Geiger tube, such as a random background count. In this event, the integrating means 72 is effective to prevent the application of an operating voltage to the input of network 31 including transistors 32 and 33.

If it is however assumed that Geiger tube 10 is in fact subjected to a condition to which it is sensitive, for example the presence of flame, this Geiger tube is effective to cause the monostable network 17 to cycle between its stable and its unstable condition, causing the saturating transformer to alternate between its saturated and unsaturated condition. As explained, as the transformer is driven into saturation, a voltage is developed across resistor 66 which quenches the Geiger tube. The apparatus then returns to its standby condition and since it is assumed that the Geiger tube 10 is subjected to the condition to which it is sensitive, the Geiger tube again becomes ionized and once again the monostable network 17 cycles and the transformer 27 is driven into saturation to again quench the Geiger tube.

In this event, a cyclic voltage is applied to the integrating means 72 and a voltage appears at the output thereof such that the upper terminal of capacitor 76 is positive with respect to the lower terminal of this capacitor. This voltage, when applied to the base electrode 36 of transistor 32, is effective to bias this transistor to a nonconducting condition. Upon transistor 32 being rendered nonconductive, the collector electrode 38 of this transistor becomes more negative and approaches the negative potential of the upper terminal of capacitor 57. This in turn causes the base electrode 37 of transistor 33 to become negative with respect to emitter electrode 35 and therefore transistor 33 is rendered conductive. The current flow circuit for transistor 33 can be traced from the lower plate of capacitor 57 through resistor 64, the emitter to collector circuit of transistor 33, and winding 41 of relay 40 to the upper terminal of capacitor 57. Therefore, relay 40 is energized and its switch 42 is closed in response to a sustained counting rate of Geiger tube 10, which sustained counting rate is indicative of the presence of the condition to which the Geiger tube is sensitive. For convenience, the output of the apparatus of Figure 1 has been labeled as "output" and it will be recognized that relay 40 can be provided with a variety of switching functions, not shown.

From the above description it can be seen that I have provided an improved electrical apparatus wherein the high voltage Geiger tube 10 is controlled by means of the low voltage transistors 18 and 19 to quench the Geiger tube through the medium of a saturable transformer 27. In this manner, it is possible to control the high magnitude operating voltage for the Geiger tube by means of the low voltage transistors 18 and 19.

Figure 2:
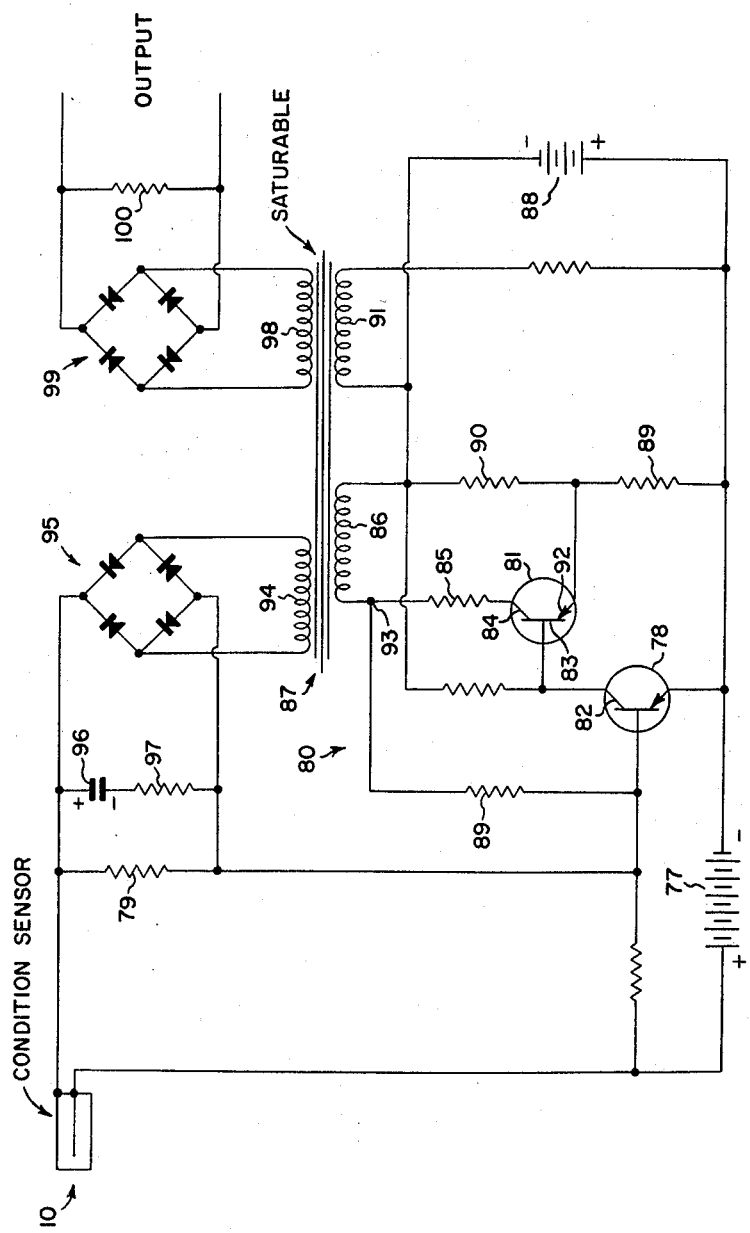
Figure 2 is a schematic representation of a further embodiment of the present invention.

Referring now to Figure 2, this figure discloses a further embodiment of the invention which is somewhat simpler in construction. The reference numeral 10 again designates the condition sensor in the form of a Geiger tube, this Geiger tube being identical to that above mentioned with regard to Figure 1. The operating voltage for Geiger tube 10 is supplied by means of a high voltage battery 77 which is connected to the Geiger tube 10 through the emitter to base circuit of a transistor 78 and through a series resistor 79. Transistor 78 is a portion of a monostable network identified generally by the reference numeral 80 and including a second transistor 81. Transistors 78 and 81 are connected in much the same manner as are transistors 18 and 19 of Figure 1. The collector electrode 82 of transistor 78 is directly connected to the base electrode 83 of transistor 81. The collector electrode 84 of transistor 81 is connected through a resistor 85 to a primary winding 86 of a saturable transformer identified generally by means of the reference numeral 87. The standby or stable state of monostable network 80 is such that transistor 78 is conductive, this state being established by means of a circuit which can be traced from the lower terminal of battery 88 through the emitter to base circuit of transistor 78, resistor 89, and winding 86 to the upper terminal of battery 88. Resistors 89 and 90 form a voltage divider network connected across battery 88 and so long as transistor 78 is conductive, the voltage developed across resistor 89 maintains transistor 81 in a nonconducting condition, in much the same manner as described in connection with Figure 1 with regard to transistor 19 and resistor 61.

The saturable transformer 87 is provided with a second primary winding 91 which is a reset winding connected to battery 88 and functioning to reset transformer 87 from its saturated to its unsaturated condition.

*Operation of Figure 2*

Upon Geiger tube 10 of Figure 2 being subjected to an ionizing condition, a current flow circuit can be traced from the positive or lefthand terminal of battery 77 through Geiger tube 10, resistor 78, and the base to emitter circuit of transistor 78. This current flow circuit provides a reverse bias for transistor 78 which overcomes the above mentioned forward bias current and thereby renders transistor 78 nonconductive. Upon transistor 78 being rendered nonconductive, the potential level of its collector electrode 82 becomes more negative and in fact approaches the potential of the negative terminal of battery 88. This in effect causes the base electrode 83 of transistor 81 to become more negative than its emitter electrode 92 and renders the transistor 81 conductive, thereby placing the monostable network 80 in its unstable condition wherein transistor 78 is nonconductive and transistor 81 is conductive.

The electrical current builds up in the primary winding 86, as the saturable transformer 87 saturates, over a time period. Upon the transformer 87 becoming saturated, the impedance of primary winding 86 suddenly drops and the potential level of the terminal identified by reference numeral 93 swings in a negative direction. This negative voltage is applied through resistor 89 to the base electrode of transistor 78 and is effective to render this transistor once again conductive. With transistor 78 conductive, the potential level of its collector 82 suddenly moves in a positive direction. This positive pulse of voltage is applied to the base 83 of transistor 81 and renders transistor 81 nonconductive, thereby placing the monostable network 80 in its stable condition.

The second primary winding 91 of saturable transformer 87 is now effective to reset the core of the transformer from its saturated condition to its unsaturated condition. The saturable transformer 87 is provided with a first secondary winding 94 which is connected to a bridge rectifier 95 and to a series connected capacitor and resistor network 96—97. As the saturable transformer is driven into saturation and then again restored to the unsaturated condition, a voltage is induced in the secondary winding 94. This voltage is rectified by bridge rectifier 95 and capacitor 96 is charged to the polarity indicated at Figure 2. This voltage is present in the supply circuit for Geiger tube 10 and it can be seen that this voltage acts in opposition to the supply voltage from battery 77. The algebraic sum of these two voltages, that is that of battery 77 and the voltage present across resistor 79 due to the charge on capacitor 96, are now applied to Geiger tube 10 and this algebraic sum is such that an operating voltage is no longer applied to the Geiger tube and therefore the Geiger tube is quenched.

Once the Geiger tube has been quenched, and once the monostable network 80 has returned to its stable condition, and transformer 87 has been reset, i.e. has arrived at negative saturation, the Geiger tube 10 is again in a condition to detect a further ionizing event. Also, during the resetting interval of transformer 87, the Geiger tube remains quenched even though network 80 has returned to its stable state. In the event that the Geiger tube is experiencing only random background counts or events, the ionizing of the Geiger tube is at a random and an infrequent interval. However, in the event that the Geiger tube is experiencing a sustained counting condition, due to the presence of the condition to which the Geiger tube is sensitive, then the monostable network 80 continuously cycles between its stable and its unstable condition, and in conjunction with saturable transformer 87 and its secondary winding 94, the Geiger tube is periodically and cyclically quenched.

The saturable transformer 87 is provided with a second secondary winding 98 which is likewise connected to a bridge rectifier 99. The output of bridge rectifier 99 is connected to a resistor 100 and to an output circuit, not shown, which has been labeled as "output." The actual output of the apparatus of Figure 2 may for example be similar to the integrating network 72 and the network 31 of Figure 1, in which case the resistor 100 of Figure 2 would correspond to the resistor 73 of Figure 1. However, since any one of a number of output circuits could be provided, Figure 2 has been simplified to the extent that no particular output circuit is shown.

As has been explained, upon Geiger tube 10 experiencing a sustained counting rate, the saturable transformer 87 is cyclically driven to its saturated condition and then returned to its unsaturated condition. In this manner, a cyclic voltage is developed in secondary winding 98 and this voltage is rectified by bridge rectifier 99 and a pulsating voltage is developed across resistor 100. This pulsating voltage across resistor 100 may be integrated to provide a steady-state voltage to perform a control function. In any event, a continuous cyclic voltage is developed across resistor 100 only upon Geiger tube 10 experiencing a sustained count rate. In the event of a random count, random and infrequent pulses of voltage will be developed across resistor 100 and means such as integrating means can be provided to discriminate against the random and infrequent background count.

From the above description it can be seen that I have provided an improved electric apparatus in which a condition sensor is controlled by a monostable electrical network and by a transformer, disclosed as a saturable transformer in the preferred embodiment, in which the Geiger tube controls the monostable electrical network and the electrical network controls the transformer to cause a voltage to be developed at a secondary winding of the transformer which is effective to render the condition sensor inoperative.

Other modifications of the present invention will be apparent to those skilled in the art and it is therefore intended that the scope of the present invention be limited solely by the scope of the appended claims.

I claim as my invention:

1. Electric apparatus comprising; a condition sensor, a source of operating voltage connected to said condition sensor; a monostable electrical network having a stable condition and an unstable condition and having input and output means; a transformer having a primary and a secondary winding; means connecting the input means of said monostable network in circuit with said condition sensor to apply a signal to said input means to cause said monostable network to assume said unstable condition upon said condition sensor being subjected to condition to which it is sensitive, means connecting the output means of said monostable network to the primary winding of said transformer to cause a voltage to appear at the secondary winding thereof as said monostable network assumes said unstable condition, and further means including the secondary winding of said transformer connected in circuit with said condition sensor to apply a voltage thereto which opposes said source of operating voltage and thereby renders said condition sensor inoperative upon said monostable network assuming said unstable condition.

2. Electric apparatus comprising; a nonselfquenching condition sensor of the type having a pair of electrodes disposed in an ionizable gaseous medium, a source of operating voltage connected in circuit with said condition sensor to apply an operating voltage thereto; a monostable network having a stable condition and an unstable condition and having input and output means, said monostable network including a first and a second transistor and a source of operating voltage constructed and arranged such that a first of said transistors is normally in a conducting condition and is connected to the second of said transistors to maintain said second transistor in nonconducting condition during the stable condition of operation of said onostable network; a saturable transformer having a primary winding and a secondary winding; circuit means connecting said second transistor in circuit with the primary winding of said saturable transformer, feedback circuit means connected from the primary winding of said saturable transformer to said first transistor; means connecting the input means of said monostable network in circuit with said condition sensor to apply a signal to said input means and thereby cause said monostable network to assume said unstable condition upon said condition sensor being subjected to a condition to which it is sensitive, said monostable network when placed in said unstable condition being effective to cause a current to flow through the prmary winding of said saturable transformer and to cause said saturable transformer to be driven into a saturated condition, said feedback circuit means being effective to maintain said monostable network in said unstable condition only so long as said transformer is not in said saturated condition, and further means including the primary winding of said saturable transformer connected in circuit with said condition sensor to apply a voltage thereto which opposes said source of operating voltage and thereby quenches said condition sensor upon said monostable network assuming said unstable condition.

3. Electric apparatus comprising; a high voltage nonselfquenching condition sensor, a high magnitude source of operating voltage connected to said condition sensor to apply an operating voltage thereto, said condition sensor being effective upon being subjected to a condition to which it is sensitive to conduct electrical current until such time as the operating voltage for the condition sensor is removed; a monostable electrical network having a stable condition and an unstable condition and having input and output means, said monostable electrical network comprising a first and a second low voltage transistor connected in circuit with a low magnitude source of operating voltage, said first and second transistors being interconnected such that in the stable condition of said monostable network said first transistor is conducting and said second transistor is nonconducting; a saturable transformer having a primary winding and a secondary winding; circuit means connecting said second transistor in circuit with the primary winding of said saturable transformer, feedback circuit means connected to said first transistor and to the primary winding of said saturable transformer, said monostable network being effective upon an input signal being applied to the input thereof to cause said first transistor to become nonconductive and said second transistor to become conductive and thereby apply electrical current to the primary winding of said saturable transformer, said electrical current being effective to drive said saturable transformer into a saturated condition, said feedback circuit means being effective only so long as said transformer is in an unsaturated condition to apply the voltage developed across said primary winding to said first transistor and maintain said first transistor in said nonconducting condition; circuit means connecting the input of said monostable network in circuit with said condition sensor such that an input signal is applied thereto upon said condition sensor being subjected to the condition to be sensed, to thereby cause said monostable network to assume said unstable condition; and further means including the primary winding of said saturable transformer connected in circuit with said condition sensor to apply a voltage thereto which opposes said source of operating voltage and thereby quenches said condition sensor upon said monostable network assuming said unstable condition.

4. Electric apparatus comprising; a transistor, a low voltage source of operating voltage connected to said transistor, a biasing circuit connected to said transistor to establish a normal conducting state for said transistor, a saturable transformer having a primary winding and a secondary winding; circuit means controlled by said transistor connecting the primary winding of said transformer to a source of voltage to cause a current to flow in said primary winding and to cause said transformer to saturate upon said transistor being rendered nonconductive, feedback circuit means connected from said primary winding to said transistor to maintain said transistor nonconductive until such time as said transformer saturates, whereupon said transistor is again rendered conductive by said biasing circuit, means including the secondary winding of said transformer to develop a high magnitude quenching voltage upon said transistor being rendered nonconductive; a high voltage nonselfquenching condition sensor, a high voltage source of operating voltage therefor; and circuit means interconnecting said condition sensor, said high voltage source, and said last named means such that upon said condition sensor being subjected to a given condition, said transistor is rendered nonconductive to thereby cause said transformer to saturate and said quenching voltage to be developed to quench said condition sensor.

5. Electric apparatus comprising; a saturable transformer having a first and a second primary winding and having a first and a second secondary winding; a transistor having an input electrode, an output electrode and a common electrode; a low voltage source of operating voltage therefore, biasing circuit means connecting the input and common electrode of said transistor in circuit with the first primary winding of said saturable transformer and said low voltage source in a manner to apply a biasing current for said transistor which establishes a normal conducting state for said transistor, output circuit means for said transistor including the common and output electrodes thereof and including means controlling the state of energization of the first transformer primary winding of said transformer, said output circuit means functioning to cause a current to flow in said first primary winding and to cause said transformer to saturate upon said transistor being rendered nonconductive, said biasing circuit means thereupon providing a feedback effective to maintain said transistor nonconductive until said transformer saturates, whereupon said transistor is again rendered conductive, reset circuit means connecting the second primary winding of said transformer to a source of voltage to reset said transformer from a saturated to an unsaturated condition; a high voltage nonselfquenching condition sensor of the type having electrodes disposed in an ionizable gaseous medium, a high voltage source of operating voltage therefor, circuit means interconnecting said condition sensor, the input and common electrodes of said transistor, said high voltage source, and the first secondary winding of said saturating transformer such that upon said condition sensor being subjected to a given condition, said transistor is rendered nonconductive to cause a high voltage to be developed at said first secondary winding, which high voltage opposes the voltage of said high voltage source and quenches said condition sensor; and further circuit means including an integrating network connected to the second secondary winding of said saturable transformer to provide an output signal only upon said condition sensor being subjected to a condition causing continuous cycle periods of ionization.

6. Electric apparatus comprising: a saturable transformer having a pair of primary windings and a pair of secondary windings; an electronic network including a transistor connected to form a monostable network having a stable condition of operation and an unstable condition of operation, said monostable network having an output connected in circuit with a first of said primary windings such that said first primary winding is energized only when said monostable network is in said unstable condition to thereby cause said transformer to saturate, a feedback circuit including said first primary winding and connected to said transistor in a manner to maintain said monostable network in said unstable condition until said transformer saturates; a reset circuit including the second of said primary windings effective to restore said transformer to an unsaturated condition; a nonselfquenching condition sensor and a source of direct current operating voltage therefor, circuit means connecting said condition sensor in controlling relation to said transistor to cause said monostable network to be controlled from said stable to said unstable condition upon said condition sensor experiencing an ionizing event, whereupon said transformer is driven into saturation; rectifier means connected to a first of said secondary windings to provide a direct current voltage upon said transformer being driven into saturation; circuit means connecting said rectifier means in circuit with said condition sensor to quench said condition sensor; and output circuit means connected to the second secondary winding and having an output thereon upon said condition sensor experiencing of ionizing events.

References Cited in the file of this patent
UNITED STATES PATENTS

| | | |
|---|---|---|
| 2,503,730 | Hare | Apr. 11, 1950 |
| 2,721,276 | Exner | Oct. 18, 1955 |
| 2,838,680 | Bender | June 10, 1958 |
| 2,866,100 | Leaver | Dec. 23, 1958 |
| 2,874,305 | Wilson | Feb. 17, 1959 |